Figure 1:
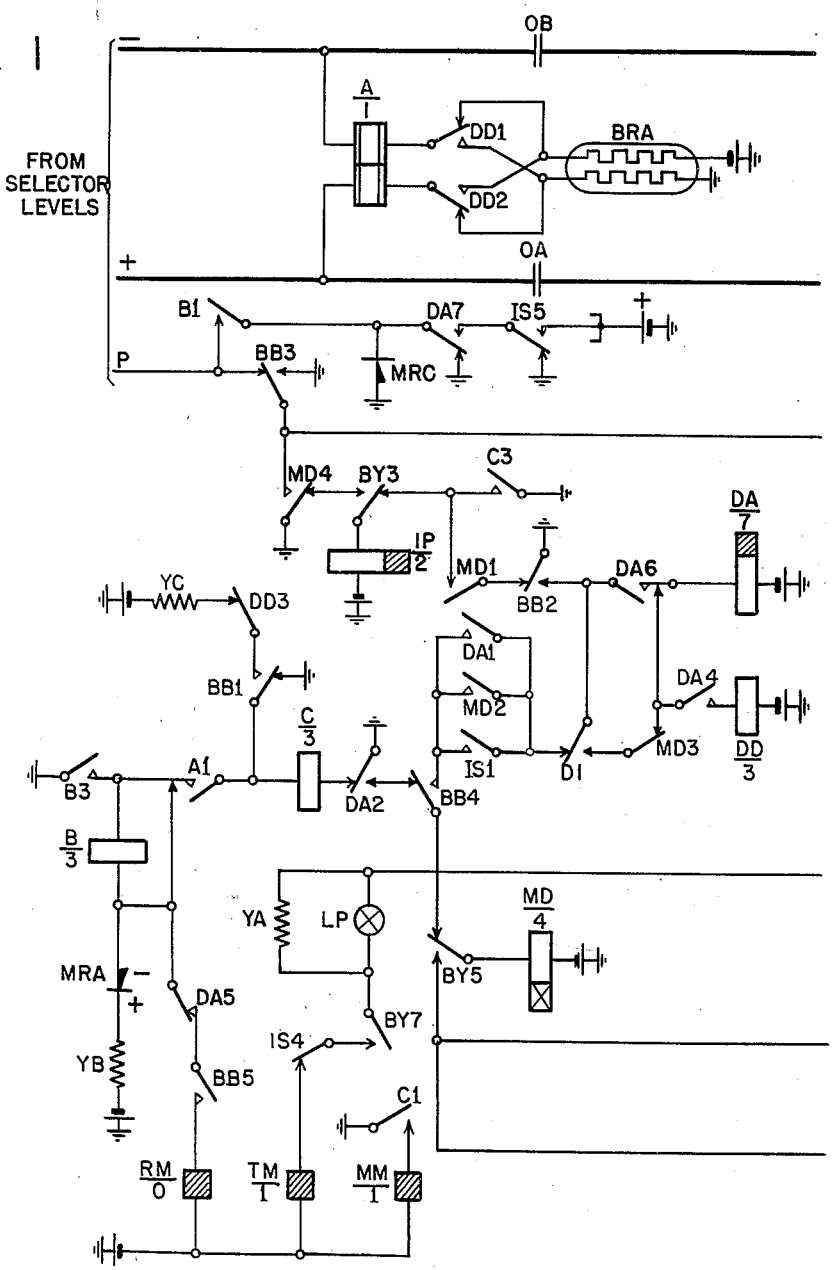

May 23, 1950 R. TAYLOR ET AL 2,508,656
INTERCONNECTING ARRANGEMENT BETWEEN TELEPHONE SYSTEMS
OF THE STROWGER AND ROTARY REVERTIVE CONTROL TYPES
Filed Nov. 30, 1945 14 Sheets-Sheet 9

INVENTORS.
Reginald Taylor
BY George Thomas Baker
Attorney

Patented May 23, 1950

2,508,656

UNITED STATES PATENT OFFICE 2,508,656

INTERCONNECTING ARRANGEMENT BETWEEN TELEPHONE SYSTEMS OF THE STROWGER AND ROTARY REVERTIVE CONTROL TYPES

Reginald Taylor and George Thomas Baker, Liverpool, England, assignors to Automatic Electric Laboratories Inc., Chicago, Ill., a corporation of Delaware Application November 30, 1945, Serial No. 632,060
In Great Britain December 8, 1944

8 Claims. (Cl. 179—16)

The present invention relates to telephone or like systems and is more particularly concerned with interconnecting arrangements between an automatic telephone system of the direct-setting type for instance operating upon a decimal basis and using switches of the step-by-step vertical and rotary type and a system of the revertively-controlled power-driven type for instance operating partly on a non-decimal basis and using switches of the rotary multi-brush type with brush tripping arrangements. For convenience these two systems will be referred to hereinafter as "Strowger" and "Rotary" systems respectively.

The general object of the invention is to provide simple interworking arrangements which will enable an existing telephone network employing Rotary type equipment to be readily extended by the use of Strowger equipment, the possibility being envisaged of the ultimate conversion of the whole of the network to the use of Strowger equipment.

According to one feature of the invention in a telephone system including an exchange employing switches operating on a direct setting basis and an exchange employing switches operating on a revertive control basis, a connection involving the two different types of exchanges makes use of a converting unit comprising an electromagnetically-operated rotary stepping switch and a group of relays which is permanently associated with the inter-exchange trunk and which serves to effect the necessary conversion from one form of control to the other.

According to another feature of the invention in a telephone system including an exchange employing switches operating on a direct setting basis and an exchange employing switches operating on a revertive control basis, on calls from the former exchange to the latter impulses dialed by a calling party are arranged to advance an electromagnetically-operated rotary stepping switch permanently associated with a trunk extending to the revertive control exchange, the stepping switch being further advanced after each train of impulses is received by impulses sent back from a revertive control switch and serving to terminate such revertive impulse sending on reaching a particular position.

A further feature of the invention is that in a telephone system including an exchange employing switches operating on a direct setting basis and an exchange employing switches operating on a revertive control basis, on calls from the latter exchange to the former an electromagnetically-operated stepping switch permanently associated with a trunk extending to the direct setting exchange is arranged by its movement to control the transmission of impulses successively both backwards to a register for setting revertively-controlled switches and forwards to effect the positioning of switches of the direct setting type.

The invention will be better understood from the following description of one method of carrying it into effect, reference being had to the accompanying drawings comprising Figs. 1–14. These include trunking diagrams which show by way of example how the invention might be applied to the Wellington-Hutt Valley telephone network of New Zealand where the conditions visualised might arise.

Figure 2:
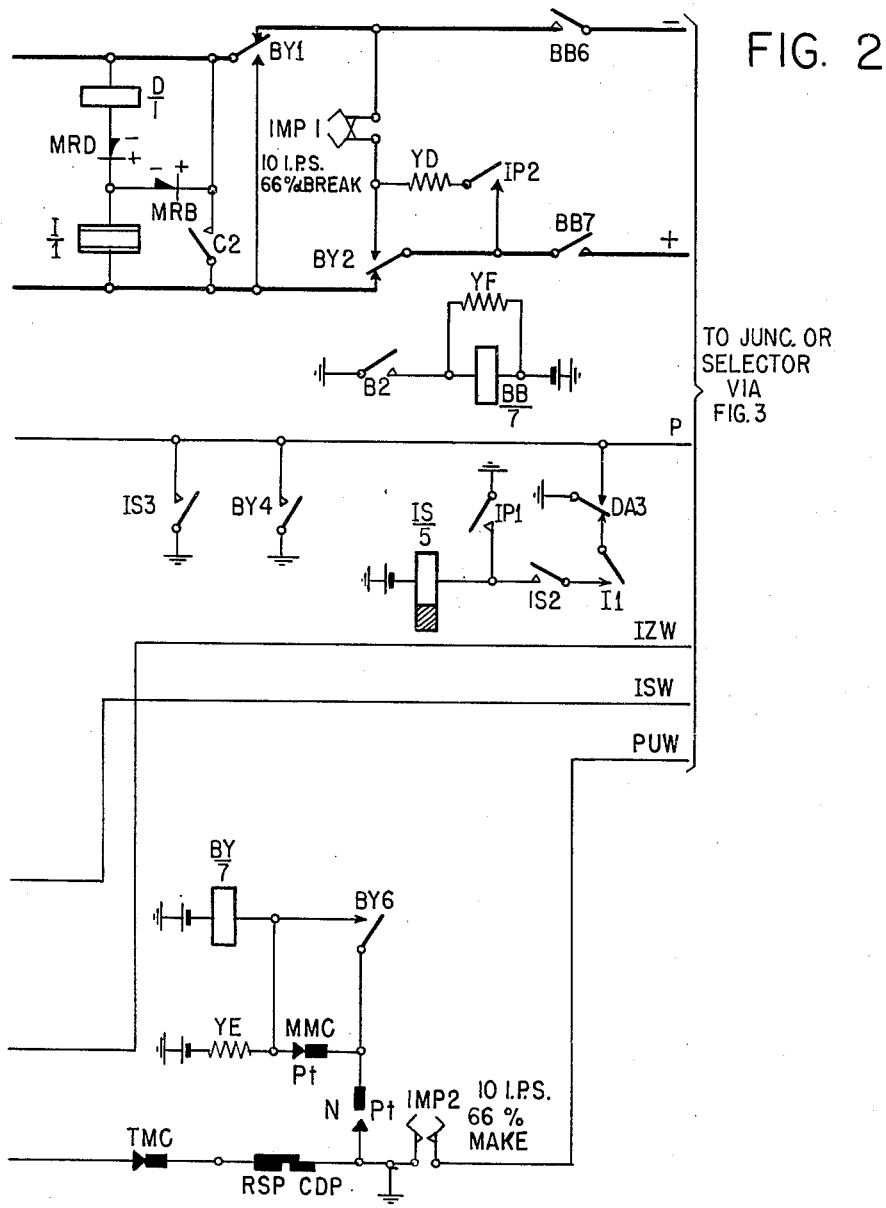
Figure 3:
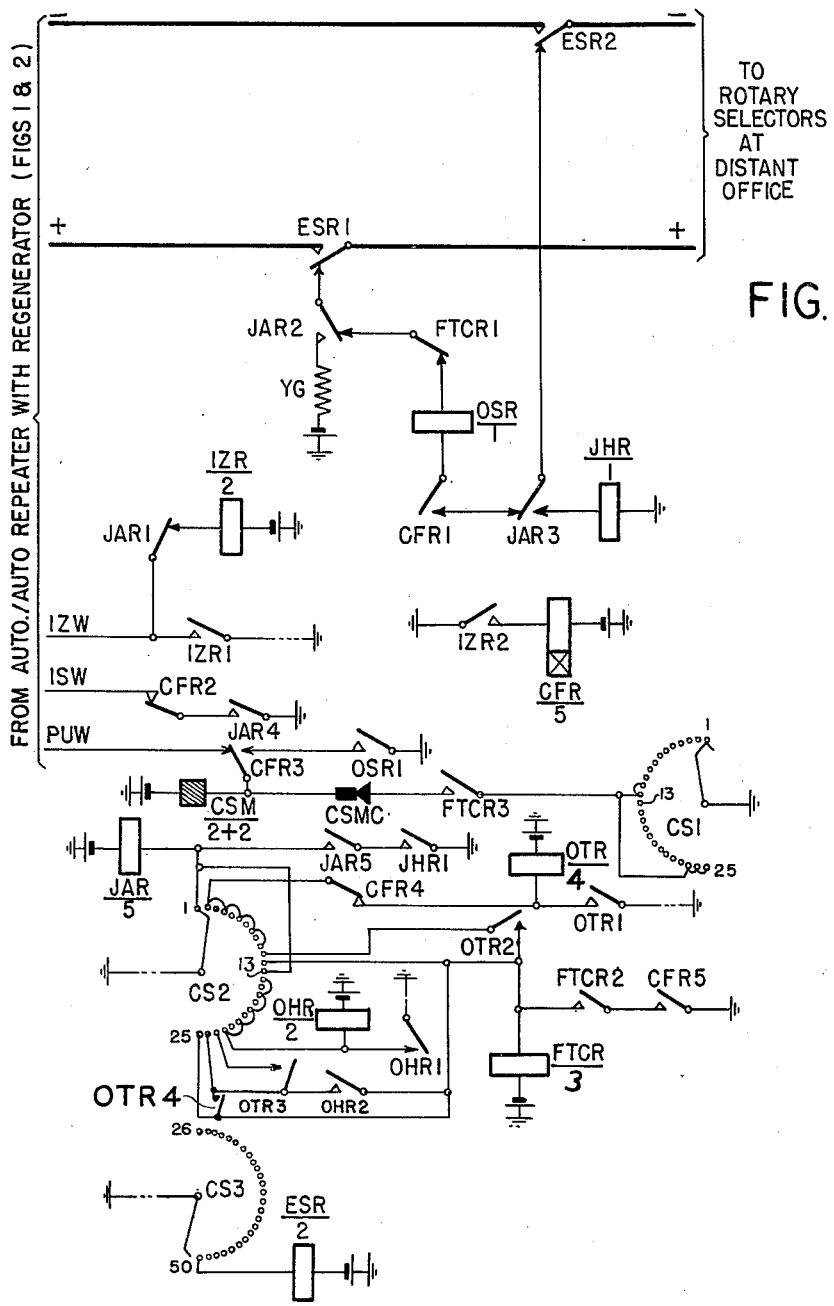

Referring now to the drawings, Figs. 1 and 2 when arranged side by side show the circuit of a modified auto-to-auto impulse repeater which includes an impulse regenerator of the type disclosed in McClew and Woodland Patent No. 2,188,461, granted January 30, 1940, and is arranged to work in conjunction with the converter unit of Fig. 3 which shows the basic circuits needed to make it suitable for use with connections proceeding from a Strowger to a Rotary exchange. The repeater of Figs. 1 and 2 is also so designed that with very slight alterations it can be arranged to serve as a straightforward auto-to-auto repeater if the network should become completely converted to Strowger operation. This is the real reason for separating the pieces of equipment represented by Figs. 1 and 2 and Fig. 3 which functionally may be regarded as a single unit.

Figure 4:
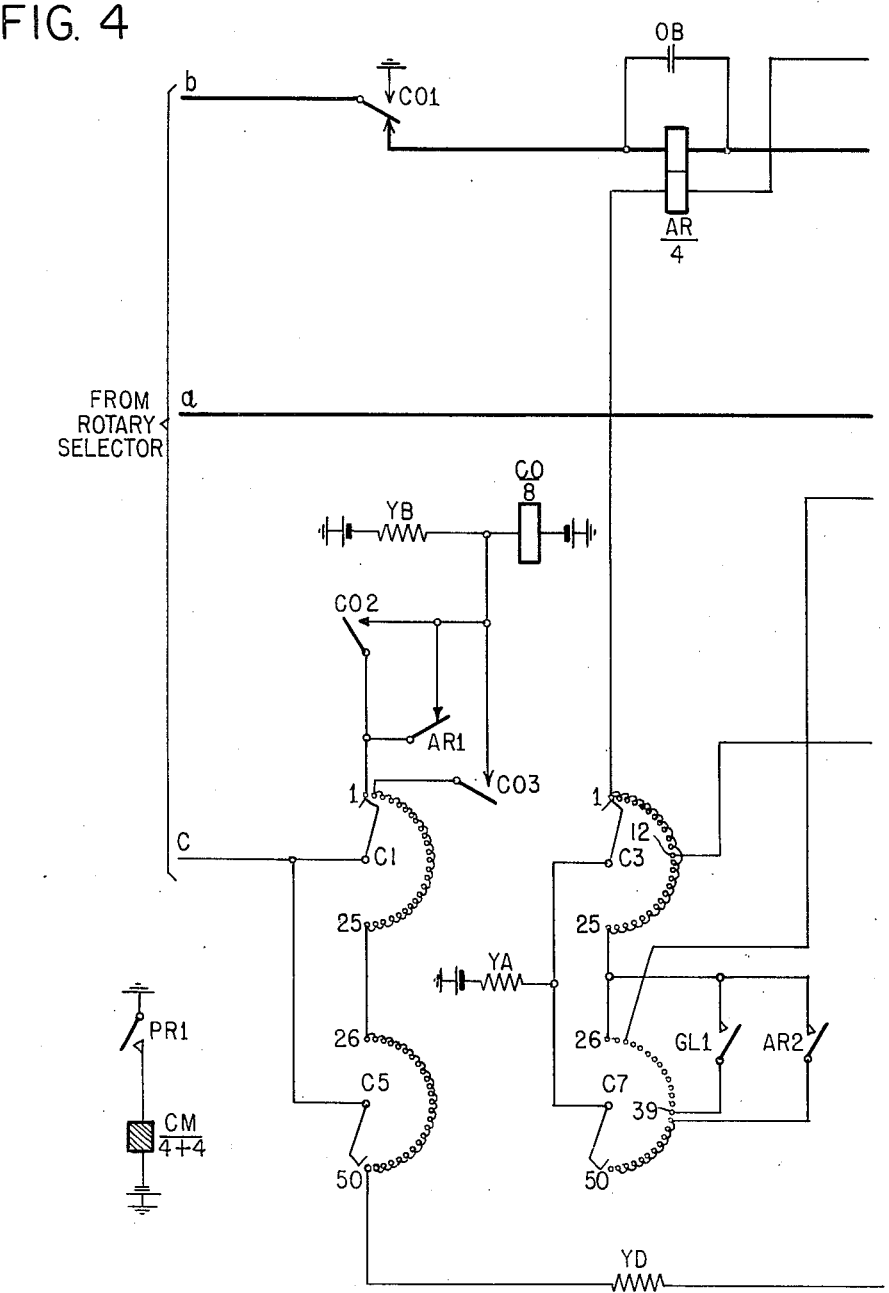
Figure 5:
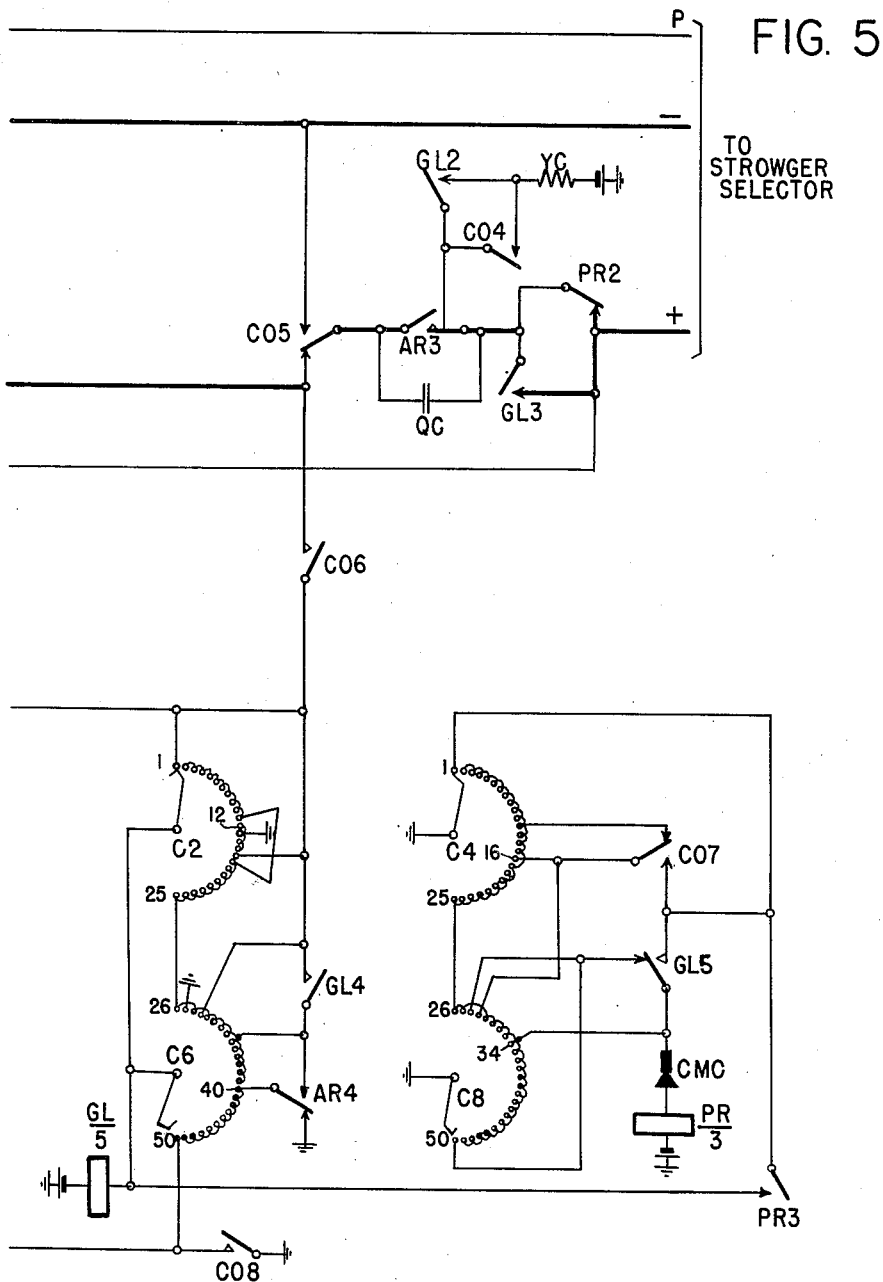

Figs. 4 and 5 when arranged side by side show the circuit of a Rotary to Strowger converter, that is to say, a piece of equipment which will be employed on calls from Rotary exchanges to Strowger exchanges.

Figure 6:
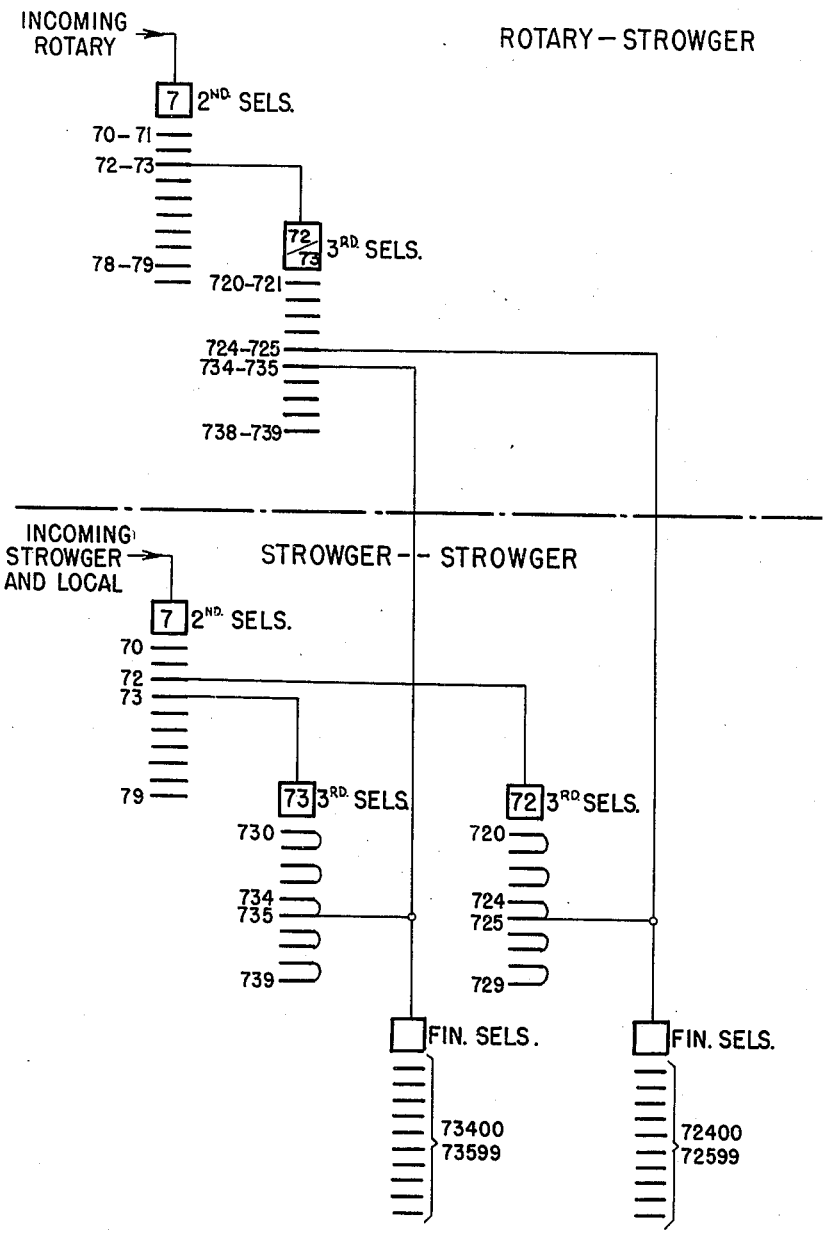

Fig. 6 is a fragmentary trunking diagram suitable for a 10,000 line exchange indicating one method of avoiding changes in existing registers by the use of separate groups of third selectors having access to common final selectors.

Figure 7:
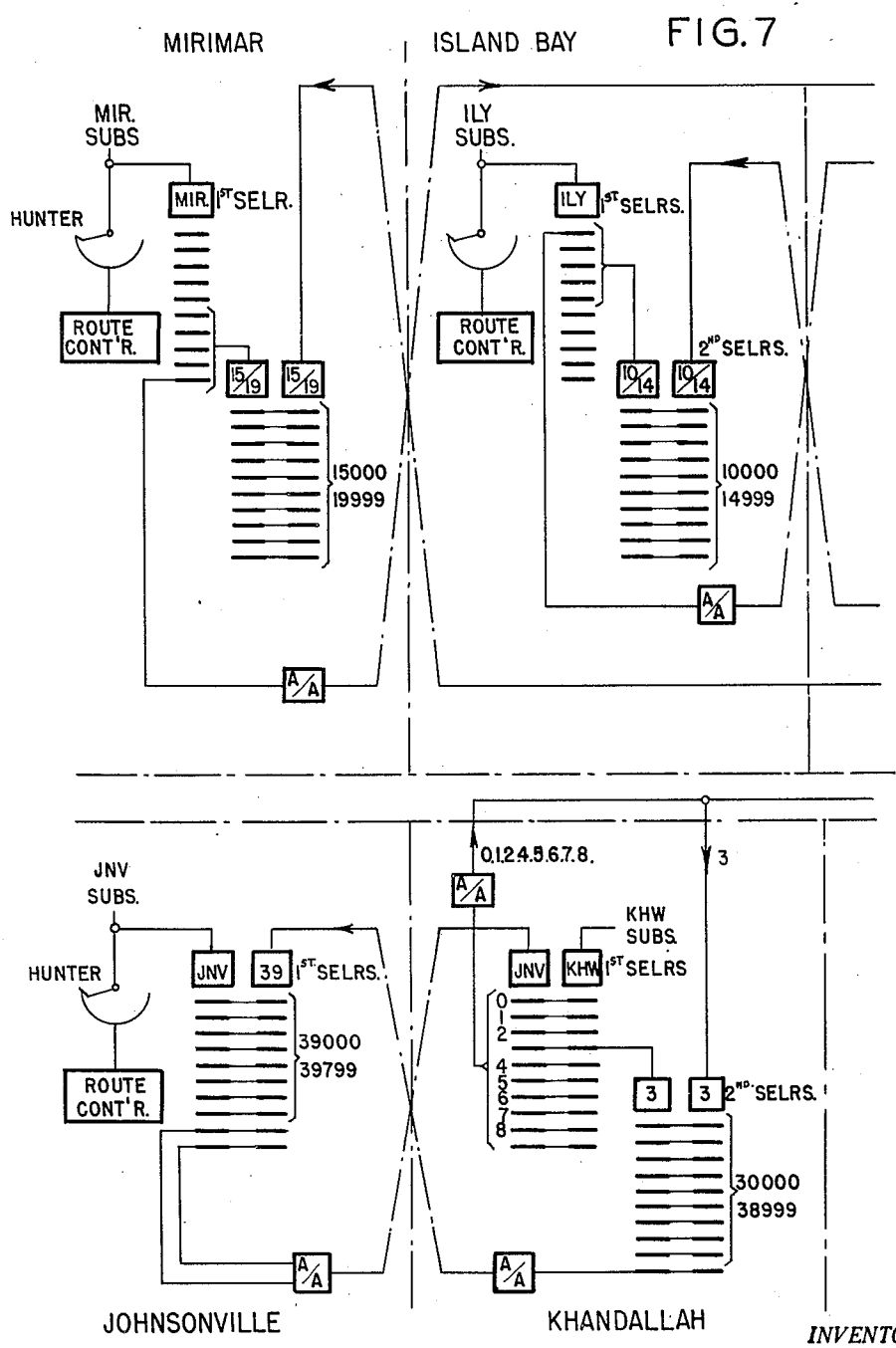
Figure 8:
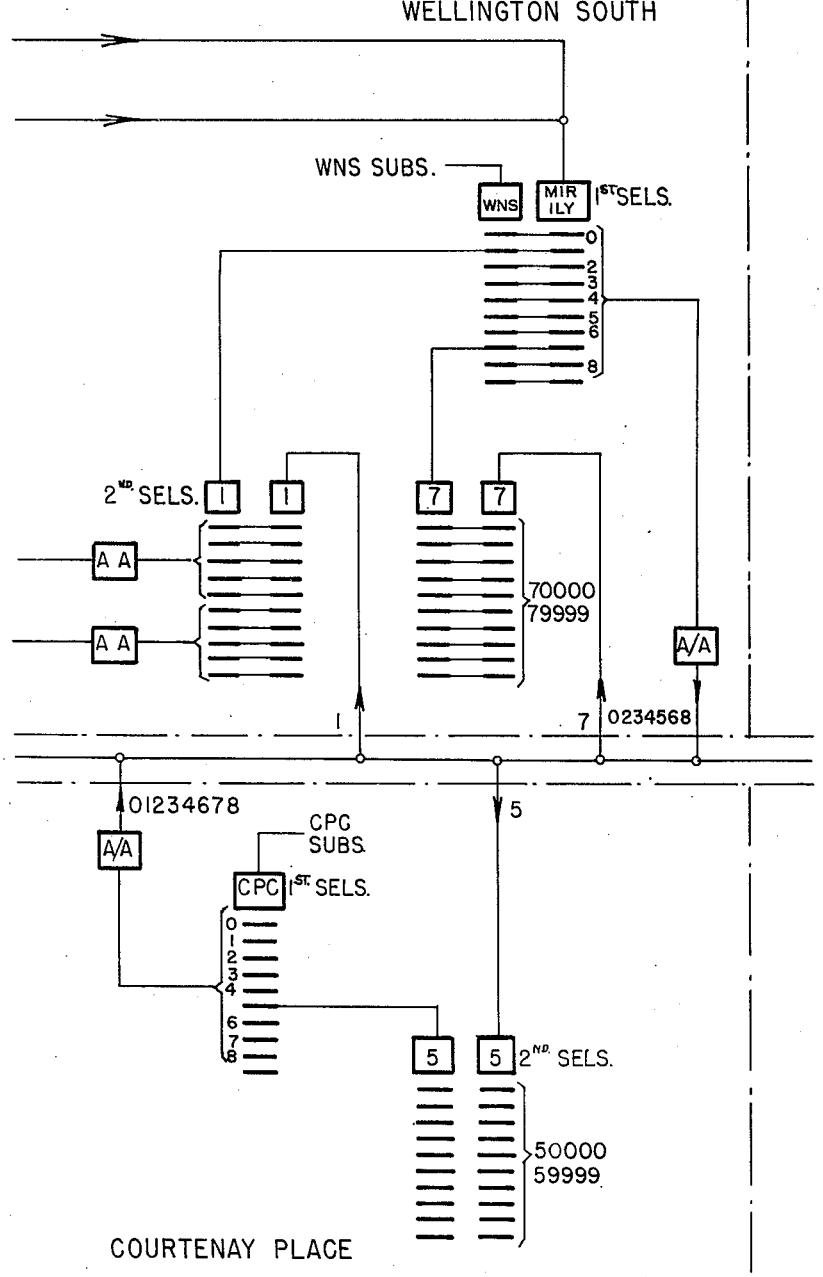
Figure 9:
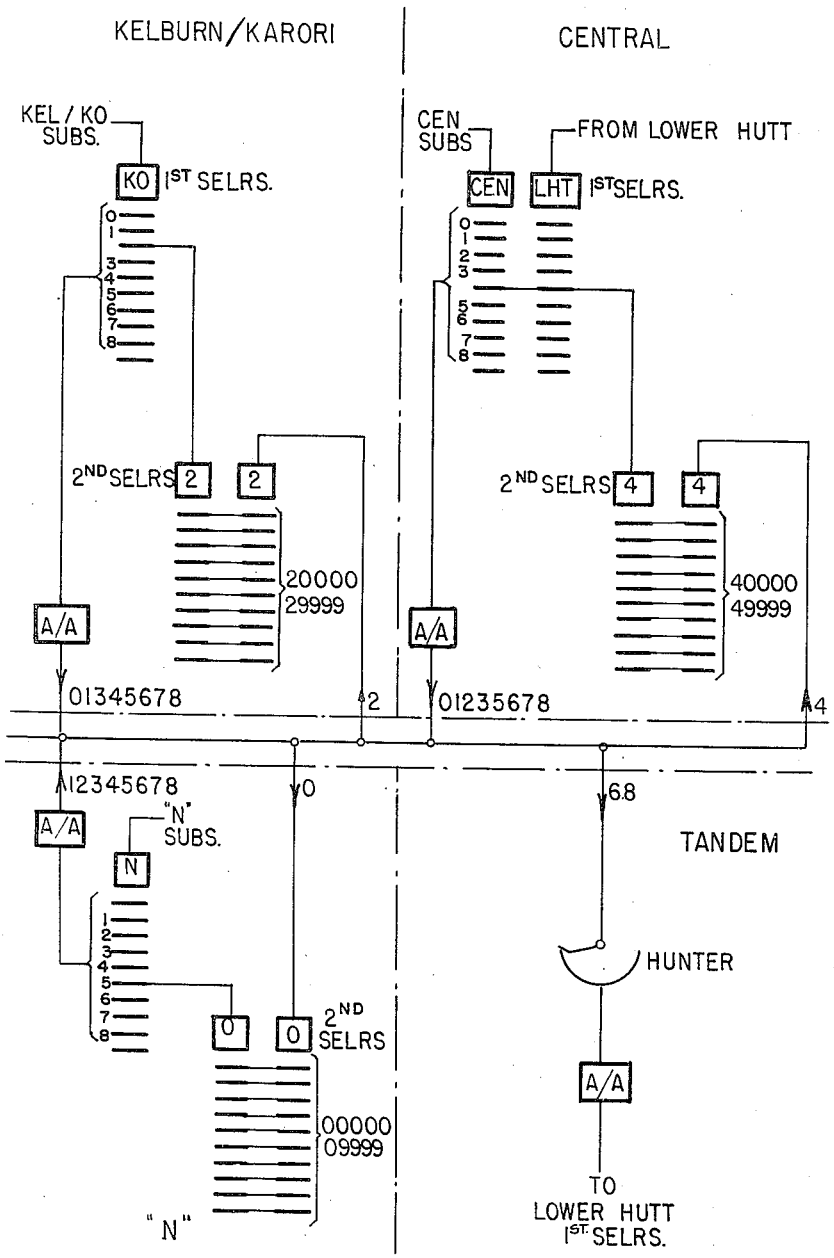

Figs. 7, 8, and 9 when arranged side by side show a suitable detailed trunking diagram of the Wellington area employing so-called route controllers.

Figure 10:
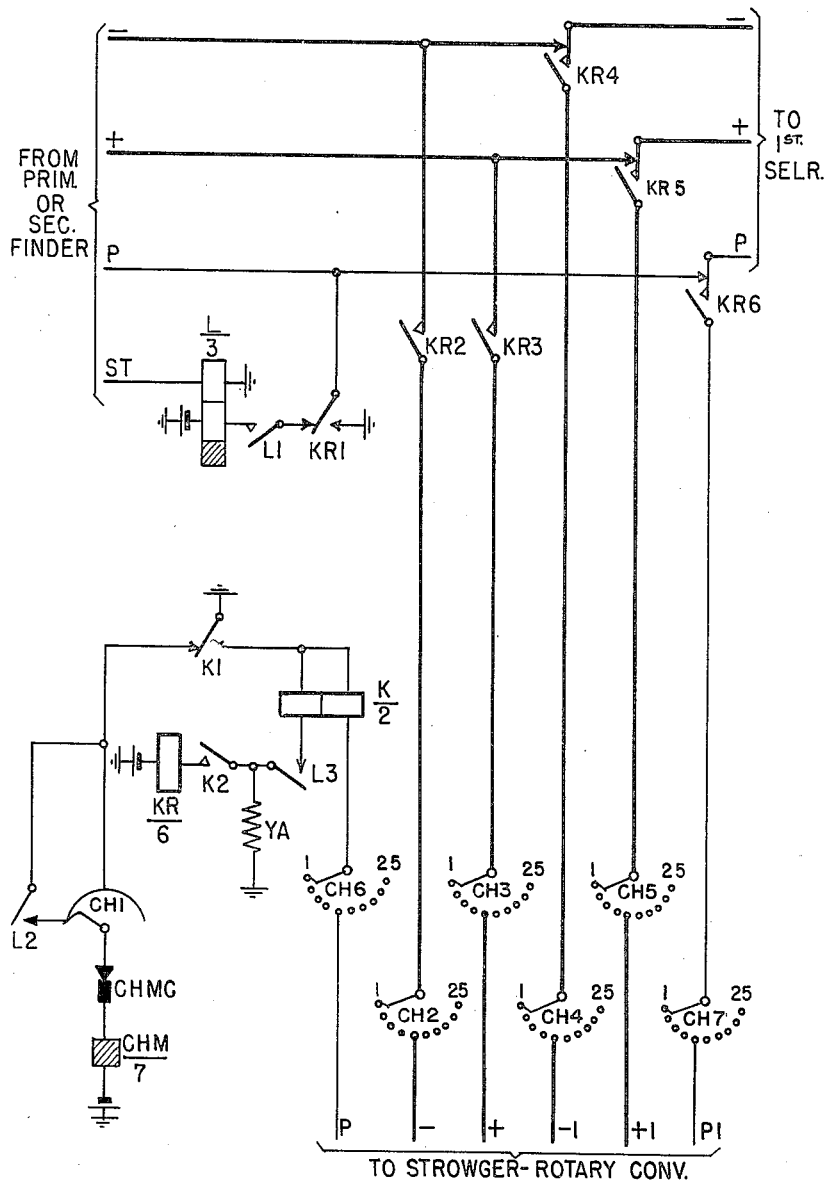
Figure 11:
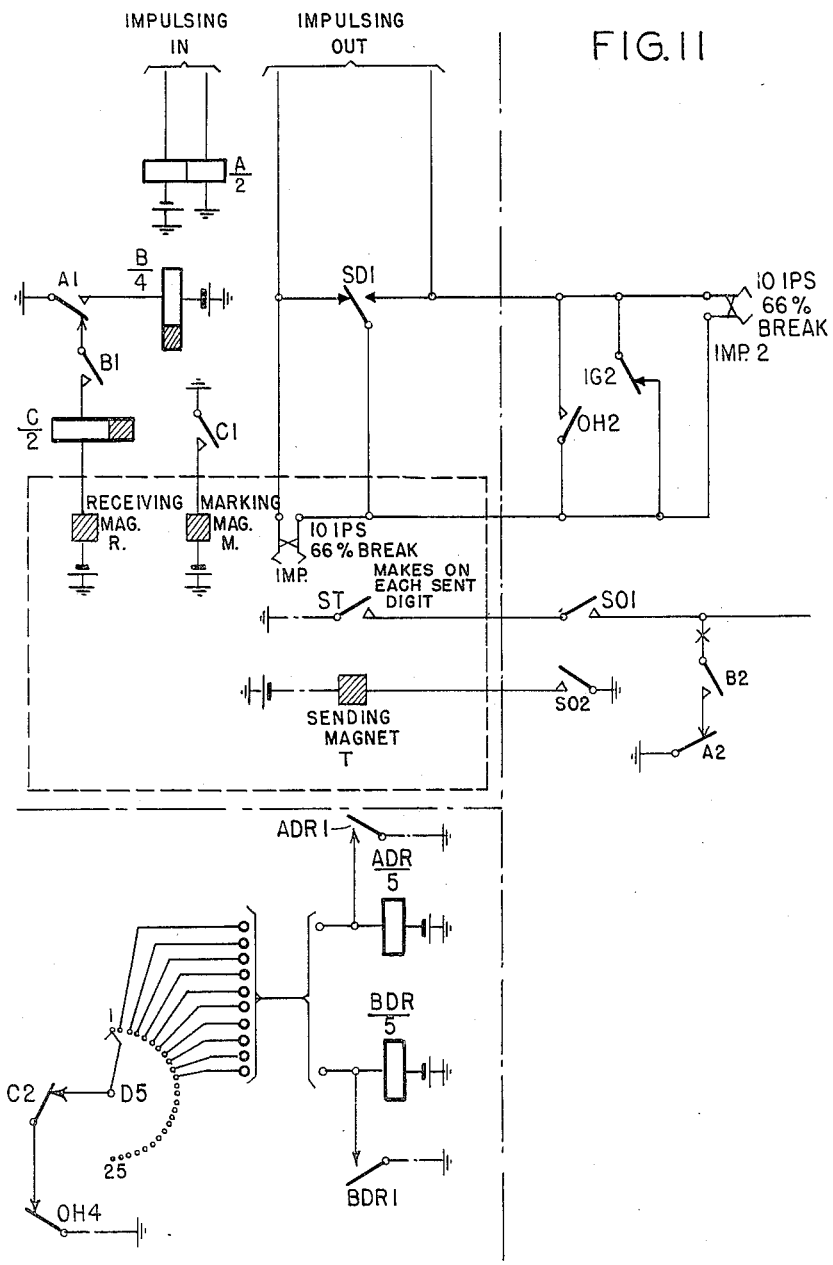
Figure 12:
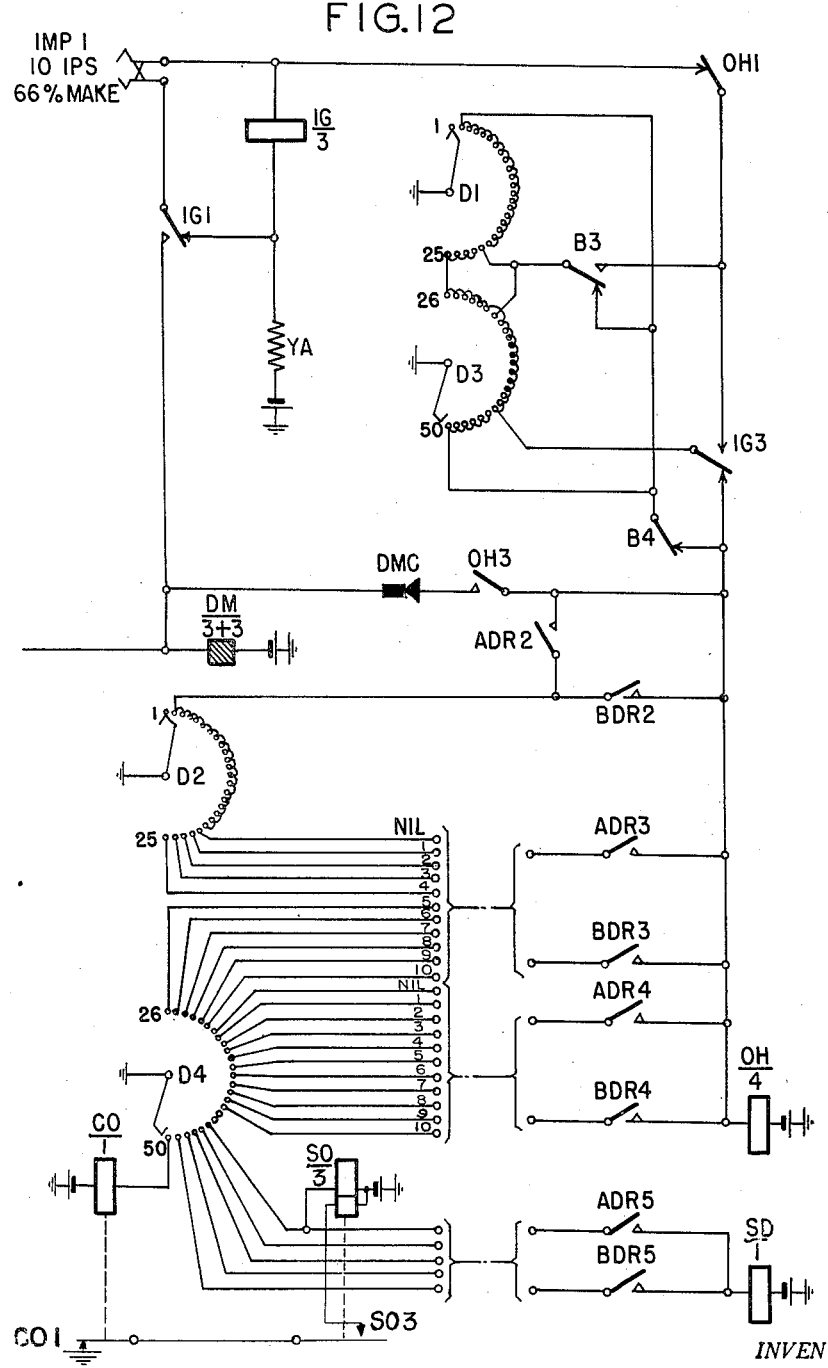

Fig. 10 is a basic circuit for a hunter switch by which such route controller may be associated with all outgoing calls in the Hutt Valley area and calls from the satellite exchanges in the Wellington area while Figs. 11 and 12 together form a basic circuit diagram of a suitable route controller. The use of such a route controller enables most of the disadvantages of a closed 5- digit numbering scheme to be eliminated while retaining the advantages as will be explained more fully later.

Figure 13:
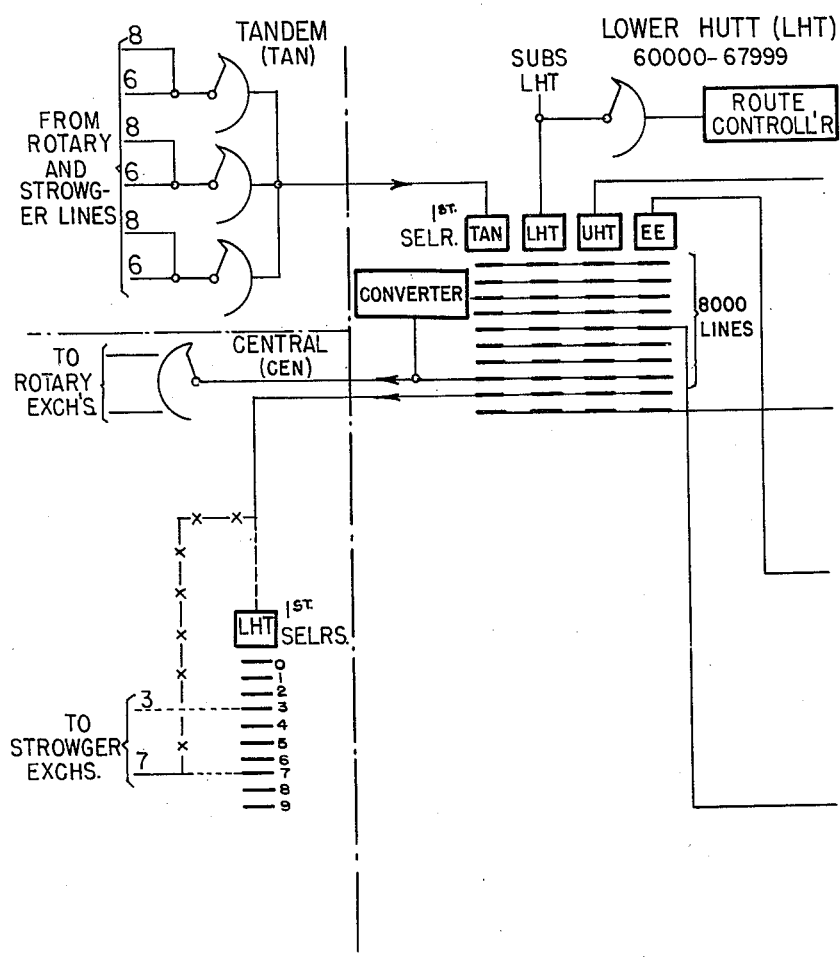
Figure 14:
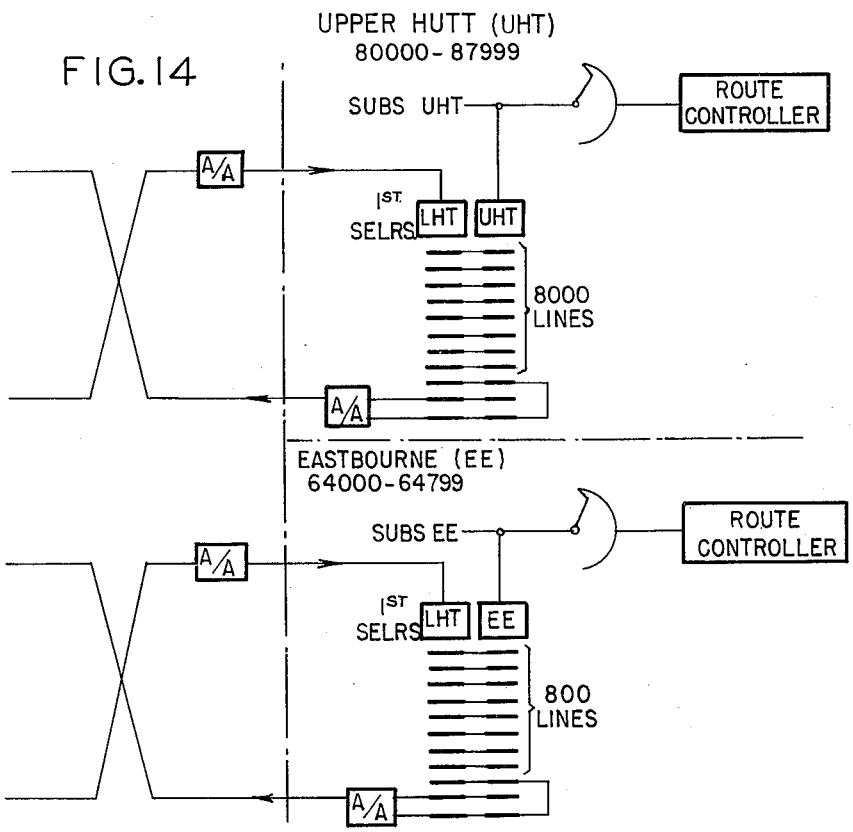

Figs. 13 and 14 represent a suitable detailed trunking diagram of the Hutt Valley area.

It should be pointed out that the various trunking diagrams take account of the fact that existing equipment employs a so-called clockwise dial in which the finger holes are labelled 0, 1, 2, 3 . . . in a clockwise direction. Consequently the associated Strowger selectors are numbered 0, 1, 2, 3 . . . downwards. It should also be explained that the subscriber's dial in all cases produces a train of interruptions of the line circuit corresponding in number to the digit dialled (1=10 as usual) and that as regards Strowger working these interruptions produce corresponding direct operation of the switches. The Strowger group selectors are 100-point switches having 10 levels of 10 contacts each, while the final selectors are 200-point switches having two 100-point banks with a wiper switching arrangement. The determination of the wiper set to be used is effected either in accordance with the access over which the switch is seized or by direct control from a converter if the call originates in a Rotary exchange. The Rotary switches are power-driven switches with 10 sets of brushes each giving access to 20 contacts so that the capacity of the switch is 200 points. The first digit for controlling the switch trips the appropriate set of brushes and subsequently in the case of group selectors a hunting operation takes place, all the brushes being moved but only the tripped set engaging its associated contacts. In the case of final selectors a further digit then controls the Rotary motion over the 20 contacts of the bank. As already mentioned the Rotary switches are power driven and the normal arrangement for their control is that the impulses dialled by the subscriber are received by a register which then controls the setting of the switches in the speaking route. When the register has received a digit and the switch is ready for setting, a loop is completed across the speaking conductors in the register and thereupon the switch is set in operation and commences to transmit impulses back to the register. When the appropriate setting of the switch has been effected, the register will have been operated to a home position and the loop at the register end is then opened, thereby bringing the switch to rest and terminating the backward transmission of impulses. The switch then hunts and during this operation battery is connected to the a speaking conductor to prevent further operation of the register. When an idle succeeding switch has been selected and is ready for operation, this battery is removed and the loop in the register is then recompleted and the setting of the succeeding switch commences.

The control exerted by the register is such that whatever the value of the first digit only the odd levels are employed but the discrimination between odd and even digits is passed on to the succeeding digit. Here again the basic principle is that as far as the value of the incoming digit is concerned only odd levels are used but if the preceding digit is odd this principle is modified to the extent that only the even levels are employed. This discrimination is passed forward over as many switches as may be necessary and serves eventually to determine which of the two groups of ten contacts comprising the twenty contacts of a level in the final selector shall be chosen.

It will be appreciated therefore that the converting equipment for permitting interworking has to take account not only of the fact that the trunking with Rotary switches is partly non-decimal but also of the fact that the method of impulsing is fundamentally different. A further point which requires consideration is that the power drive during the selecting operation does not give sufficiently rapid movement that operation over a maximum of 20 contacts can be relied upon to take place in the normal interdigital pause. Consequently some form of storage mechanism is necessary even in respect of operations of the character where no conversion is necessary. This storage function is conveniently taken care of in the arrangement of Figs. 1 and 2 by the use of a so-called mechanical impulse regenerator to which reference has already been made.

Considering now the operation of the equipment of Figs. 1–3 which will be required on a call from a Strowger exchange to a Rotary exchange this equipment will be located at the outgoing end of a junction to a Rotary exchange. When the repeater of Figs. 1 and 2 is taken into use from the bank contacts of a preceding Strowger switch, relay A operates and brings up relay B. This at contacts B1 earths the P conductor to hold the preceding switches, at contacts B2 energises relay BB and at contacts B3 completes a locking circuit for itself. Relay BB at contacts BB1 prepares a circuit for relay C which is however now short-circuited, at contacts BB2 and BB4 prepares a circuit for relay MD, at contacts BB3 connects earth to the outgoing P conductor, at contacts BB5 prepares the impulsing circuit to the magnet RM of the regenerator and at contacts BB6 and BB7 connects the speaking leads through, though in this case without effect since they are disconnected in the equipment of Fig. 3.

No further operations take place until the calling party dials the next digit of the wanted number whereupon relay A pulses correspondingly. Impulses are accordingly transmitted to the stepping magnet RM of the impulse regenerator which steps the recording arm. The short-circuit is also removed from relay C which upon operating, at contacts C1 energises the marking magnet MM so that the recording arm is enabled to pass over the protruding pins in the registering circle, at contacts C2 short-circuits relays D and I to reduce surge effects, and at contacts C3 energises relay IP. This at contacts IP1 energises relay IS and at contacts IP2 prepares a circuit, which will not be effective in these circumstances, for re-introducing the impedance of relays D and I in two stages. Relay IS at contacts IS1 energises relay MD, at contacts IS2 prepares a locking circuit for itself, at contacts IS3 connects a multiple earth to the outgoing P conductor, at contacts IS4 opens a point in the circuit of the transmitting magnet TM and at contacts IS5 prepares for the connection of booster battery to the P conductor for metering purposes. Relay MD at contacts MD1 prepares an alternative circuit for relay IP, at contacts MD2 completes a locking circuit for itself, at contacts MD3 opens a point in the circuit of relay DD and at contacts MD4 applies a further earth to the outgoing P conductor.

At the end of the train of impulses relay C releases and de-energises magnet MM which then restores the recording arm and causes it to push a pin through the mounting plate in the position to which it has been set. Magnet MM also closes its contacts MMC thereby completing a circuit from earth over the now closed off-normal contacts N for relay BY. This relay at contacts BY1 opens the negative speaking conductor and short-circuits relays D and I, at contacts BY2 connects up the impulse springs IMP1 across the outgoing speaking conductors, at contacts BY3 releases relay IP, at contacts BY4 further earths the outgoing P conductor, at contacts BY5 completes an alternative circuit for relay MD, at contacts BY6 completes a locking circuit for itself and at contacts BY7 closes a point in the circuit of the transmitting magnet TM. Relay IP now releases and brings down relay IS. Further impulses are received in a similar manner and are stored in the regenerator by the displacement of pins in appropriate positions.

Referring now to Fig. 3 it should be explained that the circuit shown is partly diagrammatic and that the dotted earth connections represent a holding earth supplied from the repeater of Figs. 1 and 2 as soon as it is taken into use, for instance over the P conductor. Accordingly when this occurs, relay JAR is immediately operated but all the other relays are normal. Relay JAR at contacts JAR1 opens a point in the circuit of relay IZR, at contacts JAR2 and JAR3 opens points in the fundamental circuit and at contacts JAR5 prepares a locking circuit for itself. Relay JAR also at its contacts JAR4 applies earth to lead ISW, thereby completing a circuit for the transmitting magnet TM, Fig. 1, which restores the last displaced pin but owing to the stepped head of the resetting pin RSP, the sending arm is still retained by this pin. The opening of contacts TMC however permits relay MD to release, thereby at contacts MD4 re-energising relay IP which in turn brings up relay IS so that the circuit of the magnet TM is opened at contacts IS4 and it releases. Thereupon the resetting pin RSP is freed from the pin CDP which it has just restored, the sending arm is released and the regenerator commences to operate its two sets of springs IMP1 and IMP2 at a controlled speed of 10 I. P. S. The former springs are ineffective in these circumstances but springs IMP2 transmit a number of impulses corresponding to the first received digit over lead PUW to operate the magnet CSM of the switch CS, Fig. 3. This switch is therefore stepped accordingly and relay OTR is operated if wiper CS2 comes to rest in a position corresponding to an odd digit. In these circumstances it locks at contacts OTR1 to the holding earth and at contacts OTR2 connects together contacts 11 and 12 in the bank of wiper CS2. When wiper CS2 of the switch CS leaves its home position, relay JAR is released and at contacts JAR1 connects relay IZR to lead IZW to which earth is connected when the sending of the first recorded digit has been completed and the stepped pin RSP on the sending arm engages the pin CDP which was dispaced in response to the registration of this digit. When this occurs therefore relay IZR is operated and locks up at contacts IZR1 and at contacts IZR2 energises the slow-to-operate relay CFR. This thereupon closes contacts CFR1 which in conjunction with contacts JAR2 and JAR3 completes the so-called fundamental circuit across the speaking conductors extending to the rotary switch in the distant exchange. As previously described, this is the signal for this switch to start sending and it transmits impulses back to the equipment of Fig. 3 to cause the intermittent operation of relay OSR. This at contacts OSR1 effects corresponding stepping of the switch CS and this continues until wiper CS2 has reached either position 11 or position 12 depending upon whether relay OTR is or is not operated. In this position relay FTCR is energised and at contacts FTCR1 opens the fundamental circuit to arrest the setting of the Rotary switch, at contacts FTCR2 locks up and at contacts FTCR3 completes a self-interrupted circuit over wiper CS1 to drive the switch to position 13.

It will be appreciated that the Rotary switch operated from the equipment of Fig. 3 has now effected brush tripping on any one of five different levels in response to any one of ten different digits, that is to say the switch has been set to the same level in response to either of two consecutive digits. It is important, however, that the difference between these digits should be registered and that the necessary distinction should subsequently be effected in the final selector by controlling the setting of the switch on one of the first group of ten contacts or on one of the second group of ten contacts during its rotary movement corresponding to the final digit. This distinction betwen the two digits which have produced the same effect as regards the brush tripping operation is carried forward to the next switch in which however the same principle is adopted of either of two consecutive digits effecting brush tripping on the same level of the switch. Thus the setting of the second Rotary switch is dependent on the value of both the first and second digits, the odd brush positions being used for second digits of any value if the first digit was even and the even brush positions being used for a second digit of any value if the first digit was odd. The setting of the final switch is thus dependent upon the setting of the preceding switch as well as upon the value of the actual final digit.

With wiper CS2 in position 13, relay JAR is again operated and releases relay IZR which in turn brings down relay CFR. This on de-energising releases relay FTCR and again connects magnet CSM to lead PUW and connects earth to lead ISW. At contacts JAR3 relay JHR is connected to the negative conductor to which battery will be applied while the switch is hunting. Relay JHR therefore operates and at contacts JHR1 completes a locking circuit for relay JAR so as to prevent any attempt at sending until the succeeding distant switch has been seized and prepared.

Relay MD, Fig. 1, is re-operated at the same time as relay IZR, Fig. 3, and thereupon releases relay IP which in turn releases relay IS and thus again prepares the circuit for the magnet TM. Consequently when earth is again connected to lead ISW on the release of relay CFR, it serves to initiate the transmission of the second recorded digit.

The wipers of the switch CS are stepped accordingly and when they come to rest relays IZR and CFR are operated as before assuming that relay JAR has by this time been released by relay JHR due to the completion of the hunting operation of the Rotary switch. If the digit just received is odd, relay OHR is also operated and thereupon locks up at contacts OHR1 and at contacts OHR2 prepares to connect earth to either the 23rd or 24th contact in the bank of wiper CS2 depending upon the condition of relays OTR and OHR. When relay CFR is operated the fundamental circuit is again completed and the second Rotary switch commences to send back impulses.

It will be appreciated that if both relays OTR and OHR are operated, a circuit is completed for relay FTCR in position 24, if only relay OHR is operated this circuit is completed in position 23, while if neither relay is operated, the switch CS advances to position 25 before relay FTCR is energised to terminate sending. The consequence of this is that if the incoming second digit is 1 or 2, ten impulses are transmitted if the preceding digit was even and nine impulses if it was odd. If the incoming second digit is three or four, the level selected is 8 if the preceding digit was even, and 7 if it was odd and so on.

The same principle is applied to the wiring of the succeeding portion of the bank of switch CS, that is to say the stepping of the switch is controlled by relay OHR in conjunction with the odd tens relay OXR (not shown).

As regards the final or units digit which controls the rotary motion of this Rotary switch, it will be appreciated that if the tens digit has been odd so that relay OXR is operated the switch moves a number of steps equal to 10 plus the value of the incoming final digit. If, however, the tens digit was even relay OXR will not be operated and over a break contact of this relay relay FTCR will be connected up ten steps ahead of the position to which it is directly connected. In these circumstances the Rotary switch is only stepped far enough to connect with a contact in the first group of ten on the chosen level.

When the full complement of digits for the Rotary exchange has been dealt with, wiper CS3 will reach contact 50 and relay ESR will then be energised to switch the speaking leads through. Relay I will then operate, this relay in the meantime having been connected up by the release of relay BY when the regenerator had discharged all its digits. Relay MD was also re-operated and relay IS is then maintained dependent on relay I. Hence at this time relays A, B, BB, MD, I and IS are operated in the repeater.

The called party is now rung and when he replies, current is reversed back over the line to operate relay D which thereupon releases relay MD which restores after its slow period. Thereupon a circuit is completed for relay DA which at contacts DA1 prepares a further circuit for relay MD, at contacts DA2 opens the circuit of relay C, at contacts DA3 releases relay IS and further earths the outgoing P conductor, at contacts DA4 energises relay DD, at contacts DA5 opens the circuit of magnet RM to prevent any further setting of the regenerator, at contacts DA6 completes a locking circuit for itself and at contacts DA7 applies booster battery to the incoming P conductor to effect metering. This circuit is opened at contacts IS5 when relay IS releases after its slow period. Relay DD sends a reversal back over the calling circuit in the usual manner.

If the called party hangs up first relay D restores and completes a circuit for relay MD which then brings down relay DD to give a reversal back to normal. When the calling party hangs up, relays A, B, BB and DA de-energise in turn and the equipment is restored to normal.

It will be appreciated that if subsequently the Rotary exchanges are replaced by exchanges operating on a Strowger basis, the unit of Fig. 3 may be eliminated and the equipment of Fig. 2 will then operate as an ordinary auto-to-auto repeater, the springs IMP1 serving in this case to effect direct repetition of the incoming impulses with suitable regeneration. Leads IZW and PUW are then disconnected and direct earth is connected to lead ISW so that sending out may take place as soon as the corresponding digit has been fully registered. Alternatively, lead ISW may be connected to the usual exchange release alarm earth whereby supervision is obtained and an alarm is given if current flows through the magnet TM for an abnormally long time. In these circumstances the operation of the equipment does not otherwise differ appreciably from what has just been described.

Considering now the operation of the equipment in Figs. 4 and 5 which represents a conversion unit for enabling a control suitable for a Rotary switch to effect corresponding operation of a Strowger switch, the equipment is taken into use in response to a test over lead c to which battery by way of relay CO is connected if the equipment is idle. Relay CO thereupon operates and at contacts CO1 connects earth to the b lead, at contacts CO2 completes a locking circuit for itself, at contacts CO3 prepares a locking circuit which will be effective after wiper C1 of the switch C moves from its home position, at contacts CO4 and CO5 prepares the outgoing impulsing circuit to the Strowger selector, at contacts CO6 prepares the circuit for transmitting impulses to the register associated with the Rotary switches, at contacts CO7 rearranges the bank wiring of wiper C4 and at contacts CO8 prepares a maintaining circuit for relay GL. The application of battery by way of resistor YC to the positive lead extending to the Strowger selector results in the energisation of the A relay therein which in turn energises the B relay and as a consequence earth is connected to the P conductor and operates relay AR over its lower winding and wiper C3 in its home position. Relay AR thereupon at contacts AR1 opens the initial circuit for relay CO, at contacts AR2 connects up the multipled contacts in the bank of wiper C7, at contacts AR3 completes a loop to the Strowger selector and at contacts AR4 alters the multipling in the bank of wiper C6.

At this time a loop is completed across the a and b conductors in the register and consequently relay GL is energised in the fundamental circuit from earth at contacts CO1. Thereupon at contacts GL1 it connects up the 39th contact in the bank of wiper C7 to relay AR, at contacts GL2 shunts contacts CO4, at contacts GL3 shunts contacts PR2, at contacts GL4 prepares a locking circuit for itself, and at contacts GL5 completes a circuit for relay PR. Relay PR at contacts PR1 energises the magnet CM of the switch C, at contacts PR2 opens a point in the outgoing loop which is however without effect since these contacts are shunted by contacts GL3 at this time and at contacts PR3 completes a local circuit for relay GL connecting earth to the incoming a lead and thus transmitting an impulse to the register by shunting out the control relay therein. The operation of the magnet CM opens contacts CMC whereupon relay PR is de-energized and opens the magnet circuit so that the wipers take one step. Relay GL is now connected to the fundamental circuit over its own contacts GL4 and the conditions are therefore re-established for further operation of relay PR and stepping of the switch C relay PR being energised over the multipled contacts in the banks of wipers C4 and C8. This operation continues until the register reaches its home position which will require a number of steps dependent on its initial setting by the calling subscriber.

Thereupon the loop across the *a* and *b* leads is opened and thus no further circuit is completed for relay GL and it releases. The circuit for relay PR is maintained however so that the switch C continues to step and since contacts GL3 are now open, impulses are transmitted by contacts PR2 over the outgoing circuit. This continues until contact 12 is reached at which time a number of impulses corresponding to the original setting of the register will have been sent since the register has a cycle of 11 steps. When wiper C3 reaches contact 12, the circuit of relay AR is opened and it releases though without any detrimental effect, and battery by way of resistor YA is momentarily connected to the *a* lead to simulate the signal indicating the hunting operation of a Rotary switch which signal advances the sequence switch in the register. Relay GL is re-energised locally over wiper C2 and the interval required for stepping over contacts 12—15 gives the Strowger switch time to hunt. The drive for the C switch is maintained until position 16 is reached and in this position relay GL is again connected to the *a* lead while relay AR has already been reoperated.

When the register is ready to send the next digit which under the conditions assumed is the tens digit, the fundamental circuit is completed therein and relay GL again operates. Thereupon at contacts GL5 it again energises relay PR to cause the switch to advance and in subsequent positions of the switch the previous circuit is completed to enable the switch to step to position 28. When the register is restored to normal for this digit also, the fundamental circuit is opened therein and relay GL releases, thus enabling contacts PR2 to transmit impulses to the Strowger selector representing the complement of the number of impulses transmitted back to the register. In position 27 relay AR is released while relay GL is re-operated from direct earth picked up by wiper C6 and thereby prevents the further operation of relay PR becoming effective. In position 28 of wiper C6 relay GL is again connected to the *a* lead and serves to simulate the connection of battery normally effected by a rotary switch while it is hunting. While the switch C remains in position 28 the earth connection to the *a* lead in the register is removed so that relay GL releases and at contacts GL5 initiates the advance of the switch C to position 29. Battery via resistor YA applied over wiper C7 to the outgoing positive lead at this time prevents a further impulse being transmitted to the Strowger selector. In position 29 relay GL is again connected to the *a* lead and when the register is ready to send, the fundamental circuit is completed and relay GL operates, thereby at contacts GL5 initiating the movement of the switch C to position 30 after which the previously described driving circuit becomes effective.

The units digit recorded in the register may constitute any number from 1 to 20 while the Strowger switch cannot accept more than ten impulses but switching over to a second set of wipers takes place if a loop is completed over the speaking leads between the transmission of the tens and units digits, the wiper switching relay being temporarily included in series with the negative lead. Relay AR is now de-energised however so that the holding of the Strowger final selector is being effected by battery through resistor YC applied to the positive lead. Operation of the switch C now continues as before and impulses are transmitted back to the register. If the number of impulses required to restore the register to normal is 10 or less, relay GL will be normal when position 39 is reached and relay AR will not again be operated during impulse sending. In this case wiper switching does not take place and relay GL is operated over contacts AR4 while the switch is stepping through positions 40–49. If, however, the register requires more than 10 impulses to restore it to normal, relay GL will still be operated when position 39 is reached and will therefore re-operate relay AR over wiper C7. This relay at contacts AR3 then completes the loop circuit in the previously described manner so that wiper switching takes place in the Strowger final selector. Relay AR then remains energised for the next 10 steps of the switch C over contacts AR2 and at contacts AR4 maintains the connection of relay GL to the *a* lead so that it is able to exercise its usual function of determining how many impulses shall be sent to the Strowger switch. When the switch steps to position 50, the locking circuit for relay CO is opened and relay GL is then held up over wipers C5 and C6 in position 50. Relay AR is also now de-energised and after the release of relay CO, holding of the Strowger final selector is again effected over the positive lead only while battery is connected to the negative lead in the Strowger switch and also to the *b* lead in he rotary switch.

The wanted party is now rung in the usual manner and when he replies, a battery reversal takes place. Relay AR is then re-operated by way of its upper series winding and at contacts AR3 completes the speaking connection.

If the called party hangs up first, a reversal back to normal takes place and relay AR is de-energized and the Strowger switches are held up over contacts GL2. When the calling party hangs up, earth is removed from the *c* lead whereupon relay GL de-energises and the connection over the Strowger switches is released and relay PR steps the switch C to normal.

It may be mentioned that the wiring of the equipment of Figs 4 and 5 represents the case of a Strowger extension to a Rotary exchange so that both kinds of equipment are located in the same exchange but the general principles remain the same if separate Rotary and Strowger exchanges are concerned.

Considering now Fig. 6, this indicates by means of a trunking diagram with typical digit values inserted how traffic incoming to a Strowger exchange from both Strowger and Rotary exchanges can be conveniently dealt with by making use of separate groups of third selectors but with final selectors common to both groups. For the incoming Rotary traffic the trunking of the Strowger switch levels is in accordance with usual Rotary principles as this obviates charges in the existing registers. This arrangement is slightly more expensive in view of the necessity for providing a somewhat greater number of third selectors but as these are standard Strowger switches they can readily be incorporated in the subsequent development plan.

Figs. 7, 8 and 9 together indicate suitable trunking arrangements for the Wellington area on this basis and it will be seen that for this area route controllers are only needed in the satellite exchanges Johnsonville, Island Bay and Mirimar. It would have been possible to obtain similar results in these exchanges by the use of digit absorbing and discriminating equipment of a type already known but it is convenient to use the same piece of standard equipment throughout both in the Wellington area and in the Hutt Valley area.

The trunking arrangements for this latter area are shown in Figs. 13 and 14 and the general plan will be readily followed. The converter shown associated with the trunk from level 7 of the first selectors in Lower Hutt represents the equipment of Figs. 1–3.

It should be mentioned that in the trunking diagrams for both areas certain outgoing trunks are shown as accessible from two separate levels conveniently levels 8 and 9. The purpose of this arrangement is to cater for the case which applies as regards local trunks from Lower Hutt and also as regards the trunks between Johnsonville and Khandallah, where trunks of two grades of transmission efficiency are provided, all the trunks being connected to both levels but in reverse order: that is to say in one level the low grade trunks are first choice and in the other the high grade trunks are first choice. By this arrangement it is possible to ensure that the high grade trunks are available first to connections extending to distant parts of the network.

The converter itself is shown in essentials in Figs. 11 and 12 and a suitable circuit for causing it to be associated with a subscriber's line as soon as he initiates a call is shown in Fig. 10.

Referring to this figure, when a first selector has been taken into use from the primary or secondary finder which has made connection with the calling party's line, battery is applied to the start lead ST to cause the operation of relay L by way of its upper winding. It thereupon locks up at contacts L1, at contacts L2 completes a self-interrupted circuit for the magnet CHMC of the hunter switch CH over the home contact of wiper CH1 and at contacts L3 prepares a test circuit for relay K. The driving circuit for the switch is subsequently maintained over the homing arc of wiper CH1 and stepping therefore continues until the test wiper CH6 encounters battery on the P lead indicating an idle route controller. Relay K is then operated over its two windings in series and at contacts K1 brings the switch to rest and short-circuits its high resistance winding to busy the seized route controller and at contacts K2 energises relay KR. This relay thereupon at contacts KR1 releases relay L and earths the incoming P lead, at contacts KR2 and KR3 connects the incoming speaking leads to the route controller so that impulses may be transmitted thereto, at contacts KR4 and KR5 completes the outgoing impulsing circuit from the route controller and at contacts KR6 renders the holding of the switches dependent on the route controller.

Considering now Figs. 11 and 12, the actual seizing and releasing arrangements for the route controller are not shown but only the in and out impulsing circuits. When the equipment is seized, relay A is operated over the subscriber's line and at contacts A1 energises relay B. This at contacts B1 prepares the impulsing circuit, at contacts B2 prepares a circuit for the driving magnet DM of the switch D and at contacts B3 and B4 alters the connections in the banks of wipers D1 and D3. When the subscriber dials corresponding setting is effected of the impulse regenerator which as in the case of that shown in Figs. 1 and 2 is assumed to be of the type disclosed in Patent No. 2,188,461. Relay C performs its usual function of energising the marking magnet MM and also serves to hold earth off wiper D5 while stepping is taking place. Furthermore, over contacts A2 and B2 direct repetition is effected to the magnet DM so that the switch D is operated in accordance over the first or the first and second digits dependent on the requirements of the trunking layout. In accordance therewith one of the relays such as ADR and BDR is operated over suitable cross-connections from the bank of wiper D5 and this relay locks up to a suitable holding earth and energises relay OH since wiper D2 is now off-normal. Relay OH completes a self-interrupted circuit for the magnet DM so that the switch wipers are advanced to position 21. The discriminating relay (either ADR or BDR, depending upon which is operated) also disconnects contacts B2 as indicated by the cross so as to prevent further setting of the switch D by incoming digits.

The route controller is arranged to transmit either one or two routing digits or none at all and suitable corss-connections are therefore made from the terminals connected to the banks of wipers D2 and D4 to the terminals on the right-hand side of the cross connecting block which utilise contacts of the appropriate ADR, BDR relay according to which relay has been operated in the particular circumstances. If no routing digits are required so that the effect of direct dialling is obtained, both terminals marked "NIL" are cross-connected to the appropriate terminals on the right hand side. If one routing digit is required the terminal in the first group numbered in accordance with the value of this digit is cross-connected and also the terminal marked "NIL" in the second group. If two routing digits are required, the terminals in the two groups respectively corresponding to the values of these digits are cross-connected to the appropriate terminals on the right-hand side.

Assume in the first instance that no routing digits are required, when wiper D2 reaches position 21 relay OH will be maintained over the cross connection and the switch stepping circuit and the relay holding circuit will be maintained over wiper D1 or wiper D3. Similarly when position 32 is reached by wiper D4 a circuit is again provided over the second NIL terminal and the cross-connection and hence the switch moves on to position 45.

If the routing digits 6 and 8 are required and the appropriate cross connections are made, when wiper D2 reaches position 21 relay OH is de-energised. Thereupon at contacts OH1 it completes a circuit for relay IG which is effective when the impulse springs IMP1 next open, at contacts OH2 it removes one of the shunts from the impulse springs IMP2, at contacts OH3 it opens the self-interrupted circuit of the switch magnet DM so as to bring the switch to rest and at contacts OH4 it again permits earth to be connected to wiper D5 which is now ineffective. Relay IG upon operating, at contacts IG1 prevents itself being again short-circuited when the impulse springs next close and in conjunction with contacts IG3 completes a circuit for pulsing the magnet DM at ten impulses per second, while at contacts IG2 it removes the other shunt from springs IMP2. The switch therefore steps on under the control of springs IMP1 while at springs IMP2 corresponding impulses are transmitted over the out impulsing circuit until wiper D4 engages contact 27 at which time six impulses will have been sent. Relay OH is then again operated over the cross-connection and terminates the transmission of impulses over the out impulsing circuit and releases relay IG. In consequence of earth supplied over contacts IG3 the switch D then advances to position 32 in which relay OH is again de-energised and the transmission of the second routing digit 8 commences. After this digit has been transmitted, relay OH again operates and the switch advances to position 45 as in the previous case. Relay SO is operated in this position and at contacts SO1 prepares a circuit for advancing the switch D one step for each digit transmitted from the regenerator and at contacts SO2 initiates the sending out of the stored digits.

Facilities for absorbing one or more of the digits transmitted by the calling party are provided by suitable cross-connections to operate relay SD. This relay at contacts SD1 normally short-circuits the sending springs of the regenerator so that not until it is operated will stored digits become effective on the out impulsing circuit. This operation will necessarily take place at a time when the sending springs are closed.

When the sending out has been completed, relay CO is operated over wiper D4 in the 50th position and effects release of the equipment in a manner not shown, for instance by removing battery from the P conductor of Fig. 10 so that relay KR is released and the speaking circuit is switched through. Accordingly the use of the route controller permits much greater flexibility in the trunking arrangements by enabling one or two routing digits of suitable value to be employed and also by simplifying the digit absorbing arrangements.

The function of the route controller in the Hutt Valley area as depicted in Figs. 13 and 14 will now be better appreciated. For calls from Lower Hutt to the Wellington area any first digit except 6 or 8 will cause the route controller to transmit the routing digit 7 or 8 according as the wanted exchange is of the Rotary or Strowger type and the full complement of dialled digits will then be transmitted. This statement needs qualification to the extent that while there is only one Strowger exchange in the Wellington area the use of first selectors at Central for calls to this exchange is unnecessary as indicated by the chain and dash line and the first dialled digit may therefore be absorbed. For calls local to Lower Hutt no routing digit is necessary and the first of the dialled digits is absorbed. For calls to Upper Hutt in response to the initial digit 8 the routing digit 9 is used and the first digit is absorbed. For calls to Eastbourne the routing digit is 4 and since Eastbourne is shown as comprising only 800 lines the first two digits are absorbed.

The conditions governing calls from Upper Hutt and Eastbourne will be readily appreciated from what has just been said. It may be pointed out however that on calls from Eastbourne if the initial digit is 6, a further digit is necessary to determine whether the call is local or for Lower Hutt. If it is local no routing digit is necessary and the first two digits are absorbed. If it is for Lower Hutt the routing digit is 9 and the first digit is absorbed. It will be appreciated also that owing to the provision of two grades of junctions as previously pointed out, a call desired for the Wellington area will require the routing digit 8 so as to secure a better chance of obtaining a high grade junction from Eastbourne to Lower Hutt.

We claim:
1. In a telephone system, a first exchange employing switches operative on a direct setting basis and a second exchange employing switches operative on a revertive control basis, an interexchange trunk connecting said exchanges, an electromagnetically-operated rotary stepping switch including wipers permanently associated with said trunk, means responsive to impulses dialed from said first exchange for advancing the wipers of said rotary switch, a relay responsive to the operation of said rotary switch wipers for operating one of said revertive control switches in said second exchange, another relay responsive to the operation of said revertive control switch and the sending of revertive impulses for further advancing said rotary switch wipers, and a last relay operated responsive to said rotary switch wipers reaching a particular position for terminating said revertive impulse sending.

2. In a telephone system, a first exchange employing switches operating on a direct setting basis and a second exchange employing switches operating on a revertive control basis, a trunk extending from said first exchange to said second exchange, an electromagnetically-operated rotary stepping switch including wipers permanently associated with said trunk, relay means responsive to the initiation of a call in said second exchange for operating the wipers of said stepping switch, a register in said second exchange for setting said revertively-controlled switches in said second exchange, and a pulsing relay and a register-controlled relay included in said relay means controlling the transmission of impulses back to said register and forward to effect the positioning of said switches in said first exchange in response to the stepping operations of said stepping switch wipers.

3. In a telephone system, a first exchange employing switches operating on a direct setting decimal basis and a second exchange employing switches operating on a revertive control non-decimal basis, a trunk extending from said first exchange to said second exchange, a rotary stepping switch including wipers permanently associated with said trunk, means responsive to the initial impulses dialled by a calling party from said first exchange for causing the direct setting of one or more said decimal switches of said first exchange, a magnet associated with said stepping switch, impulse receiving and regenerating means responsive to subsequent digits transmitted from said first exchange for operating said magnet to advance the wipers of said rotary stepping switch, a circuit completed responsive to said wiper advance for operating one of said non-decimal switches of said second exchange, a pulsing relay included in said circuit and operated by revertive impulses transmitted by said operation of said non-decimal switch to further advance said stepping switch wipers, and relay means responsive to said switch wipers reaching a position which varies in accordance with the value of the digit sent in for opening said circuit to terminate the transmission of said revertive impulses.

4. In a telephone exchange, a first exchange employing switches operating on a direct setting decimal basis and a second exchange employing switches operating on a revertive control non-decimal basis under control of a register thereat, a trunk connected between said exchanges, a rotary switch individual to said trunk, means including a register controlled relay responsive to the initiation of a call from said second exchange to said first exchange for operating said rotary switch, means including a pulsing relay responsive to said operation of said rotary switch for controlling the transmission of impulses back to the register in said second exchange and forward to cause the setting of said decimal switches in said first exchange, and a third relay operated in response to said stepping switch reaching a predetermined position only in case said register controlled relay is operated to control the application of potential to the line conductors outgoing to said decimal switches of said first exchange to cause selective wiper switching therein.

5. In a telephone system, a plurality of exchanges, a mechanical impulse regenerator included within one of said exchanges, a rotary stepping switch associated with said regenerator, an outgoing circuit, impulse receiving means responsive to the dialing of a called number for storing impulses in said regenerator and for causing the setting of said rotary switch, relay means operated in response to said setting of said rotary switch at a characteristic position to further advance said stepping switch, means including cross-connecting means between said stepping switch and said relay means for controlling the transmission of a predetermined number of routing digits over the outgoing circuit during said further advance of said stepping switch, and a relay controlled by said further advance of said stepping switch to subsequently control said regenerator for transmitting said stored digits over said outgoing circuit.

6. A system such as claimed in claim 3, including a relay controlled by said rotary switch and operated in a different manner dependent on whether the incoming digit is odd or even to control said relay means to terminate the operation of the non-decimal switches in different positions of said rotary switch.

7. In a telephone system, a first exchange employing switches operating on a direct setting basis and a second exchange employing switches operating on a revertive control basis, a trunk extending from said first exchange to said second exchange, an electromagnetically-operated rotary stepping switch permanently associated with said trunk, relay means responsive to the initiation of a call in said second exchange for operating said stepping switch, a register in said second exchange for setting said revertively controlled switches in said second exchange, a relay in said first exchange jointly controlled over said trunk by said register and by said stepping switch in response to the initiation of a call in said second exchange, means including a pulsing relay in said first exchange operated in response to the operation of said first relay for intermittently operating said pulsing relay and said stepping switch to take a predetermined number of steps, pulsing contacts operated by said pulsing relay for controlling the transmission of impulses back to said register to control said register, and other pulsing contacts operated by said pulsing relay for transmitting pulses forward to effect positioning of said switches in said first exchange.

8. A system such as claimed in claim 7, including contacts on said first relay for shunting said other pulsing contacts for a predetermined number of steps of said stepping switch dependent upon the control of said first relay from said register.

REGINALD TAYLOR.
GEORGE THOMAS BAKER.

REFERENCES CITED

The following references are of record in the file of this patent:

UNITED STATES PATENTS

| Number | Name | Date |
|---|---|---|
| 1,543,869 | Polinkowsky | June 30, 1925 |
| 1,672,994 | Thompson | June 12, 1928 |
| 1,837,003 | Wicks | Dec. 15, 1931 |
| 2,211,159 | Pfannschmidt | Aug. 13, 1940 |

FOREIGN PATENTS

| Number | Country | Date |
|---|---|---|
| 337,453 | Great Britain | Nov. 3, 1930 |
| 339,784 | Great Britain | Dec. 18, 1930 |